United States Patent
Iverson et al.

(10) Patent No.: US 9,160,545 B2
(45) Date of Patent: Oct. 13, 2015

(54) SYSTEMS AND METHODS FOR A2A AND A2DB SECURITY USING PROGRAM AUTHENTICATION FACTORS

(75) Inventors: Gyle Iverson, Woodland Hills, CA (US); Jeffery Nielsen, Simi Valley, CA (US); Julie Lustig-Rusch, West Hills, CA (US); James Mitchell, Moorpark, CA (US)

(73) Assignee: BeyondTrust Software, Inc., Phoenix, AZ (US)

( * ) Notice: Subject to any disclaimer, the term of this patent is extended or adjusted under 35 U.S.C. 154(b) by 676 days.

(21) Appl. No.: 12/497,429

(22) Filed: Jul. 2, 2009

(65) Prior Publication Data

US 2010/0325705 A1 Dec. 23, 2010

Related U.S. Application Data

(60) Provisional application No. 61/219,359, filed on Jun. 22, 2009.

(51) Int. Cl.
*G06F 17/00* (2006.01)
*H04L 9/32* (2006.01)
*G06F 21/44* (2013.01)

(52) U.S. Cl.
CPC ............ *H04L 9/3271* (2013.01); *G06F 21/445* (2013.01); *H04L 9/3228* (2013.01); *H04L 2209/80* (2013.01)

(58) Field of Classification Search
USPC ........ 726/6, 5, 10, 14, 21; 713/168, 175, 182; 380/277
See application file for complete search history.

(56) References Cited

U.S. PATENT DOCUMENTS

| | | | |
|---|---|---|---|
| 5,689,638 A * | 11/1997 | Sadovsky | 726/21 |
| 5,719,941 A | 2/1998 | Swift et al. | |
| 5,793,952 A | 8/1998 | Limsico | |
| 5,944,825 A | 8/1999 | Bellemore et al. | |
| 7,321,300 B2 | 1/2008 | Friedrich et al. | |
| 7,506,038 B1 | 3/2009 | Perrone et al. | |
| 7,950,051 B1 * | 5/2011 | Spitz et al. | 726/6 |
| 7,962,709 B2 | 6/2011 | Agrawal | |
| 8,346,626 B2 * | 1/2013 | Robertson | 705/26.8 |
| 2001/0049796 A1 * | 12/2001 | Roth et al. | 713/201 |
| 2002/0169747 A1 * | 11/2002 | Chapman et al. | 707/1 |
| 2004/0090930 A1 * | 5/2004 | Lee et al. | 370/328 |
| 2004/0162880 A1 * | 8/2004 | Arnone et al. | 709/206 |
| 2005/0015623 A1 | 1/2005 | Williams et al. | |
| 2005/0182969 A1 | 8/2005 | Ginter et al. | |

(Continued)

OTHER PUBLICATIONS

Bradshaw, R. et al., "A Scalable Approach to Deploying and Managing Appliances," Proceedings of the TeraGrid 2007 Conference, pp. 1-6, Jun. 4, 2007.

*Primary Examiner* — Joseph P Hirl
*Assistant Examiner* — Sayed Beheshti Shirazi
(74) *Attorney, Agent, or Firm* — Sheppard, Mullin, Richter & Hampton LLP

(57) ABSTRACT

In various embodiments, security may be provided for application to application (A2A) and application to database (A2DB) implementations. In some embodiments, a method comprises receiving a registration request at a first digital device for a first application, receiving a first program factor associated with the first application, confirming the first program factor, generating a first password for a second application based, at least, on the confirmation of the first program factor, and providing the first password to a second digital.

25 Claims, 6 Drawing Sheets

(56) References Cited

U.S. PATENT DOCUMENTS

| | | |
|---|---|---|
| 2005/0273399 A1 | 12/2005 | Soma et al. |
| 2007/0057763 A1* | 3/2007 | Blattner et al. ............... 340/5.52 |
| 2007/0255957 A1* | 11/2007 | Arnone et al. ................. 713/182 |
| 2008/0040606 A1* | 2/2008 | Narayanan et al. ............ 713/169 |
| 2008/0168545 A1* | 7/2008 | Inoue et al. ........................ 726/6 |
| 2009/0150989 A1* | 6/2009 | Hoey et al. ...................... 726/10 |
| 2009/0300057 A1 | 12/2009 | Friedman |
| 2010/0107227 A1* | 4/2010 | Hicks ................................. 726/5 |
| 2010/0111300 A1* | 5/2010 | Kido et al. ........................ 380/46 |
| 2010/0228749 A1* | 9/2010 | Castro et al. ................... 707/755 |
| 2010/0306236 A1 | 12/2010 | Cychosz et al. |
| 2010/0325703 A1* | 12/2010 | Etchegoyen ....................... 726/5 |
| 2011/0179284 A1* | 7/2011 | Suzuki et al. ................... 713/186 |
| 2011/0271114 A1* | 11/2011 | Baysinger ...................... 713/168 |

\* cited by examiner

SYSTEMS AND METHODS FOR A2A AND A2DB SECURITY USING PROGRAM AUTHENTICATION FACTORS

CROSS-REFERENCE TO RELATED APPLICATION

The present application claims priority of U.S. Provisional Patent Application No. 61/219,359, filed Jun. 22, 2009, entitled "A2A and A2DB Security Using Program Factors" which is hereby incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to application-to-application (A2A) or application-to-database (A2DB) security. More particularly, the invention relates to systems and methods for A2A and A2DB security using program authentication factors.

2. Description of Related Art

Often too many users of a network are granted full, unrestricted superuser, root, or administrator privileges, regardless of whether or not they need this access all the time and regardless of whether they need access to perform their current duties. This "all trusting" environment is frequently coupled with a lack of accountability of this access. Unfortunately, these privileged accounts are often exploited by unethical insiders and hackers to perpetrate fraud, theft, and damage.

A similar issue exists with non-human processes in the area of application-to-application (A2A) or application-to-database (A2DB) communication involving service accounts on various IT systems. The passwords for these accounts are often hard-coded or embedded in the calling application or script and rarely, if ever, changed. Couple this with the fact that any skilled administrator or programmer with access to the application source code or script can view those passwords, and the potential damage associated around exploitation moves to a higher dimension that may be even harder to spot and prevent.

Due to the depth of access that privileged and embedded passwords provide to highly sensitive and confidential information, and the fact that these access credentials are shared among administrators, it is only natural that security experts and compliance auditors are recommending and requiring more scrutiny and control in this area. Without a system of checks and balances and overall accountability for privileged and embedded passwords, an organization lays itself open to exploitation and exposes its mission-critical systems to intentional or accidental harm and malicious activity that is difficult and costly to repair.

SUMMARY

In various embodiments, security may be provided for application to application (A2A) and application to database (A2DB) implementations. In some embodiments, a method comprises receiving a registration request at a first digital device for a first application, receiving a first program factor associated with the first application, confirming the first program factor, generating a first password for a second application based, at least, on the confirmation of the first program factor, and providing the first password to a second digital device.

The first program factor may be selected from the group consisting of a program name, a program version, a program executable hash, a dependent DLL name, shared library names, a dependent DLL version, shared library versions, environmental factors, and debugging identification. Alternately, the first program factor may be selected from the group consisting of a system name, a fully qualified domain name (FQDN), a domain name, an IP address, a MAC address, a user name, a user ID, a CPU ID, a CPU serial number, a root disk volume ID, an OS version, and an OS type.

The method may further comprise determining if the first password is within a cache. Further, the method may comprise providing the first password from the cache based on the determination. The method may also comprise providing a challenge factor request, receiving a challenge factor response, and confirming the challenge factor response. The method may further comprise determining if the first password is expired.

In some embodiments, the method may further comprise confirming a second program factor associated with the first application. Further, generating a first password for the second application based, at least, on the confirmation of the first program factor may comprise generating a first password for the second application based, at least, on the confirmation of the first program factor and the confirmation of the second program factor.

The method may further comprise receiving a password request at the first digital device for a second application, confirming a first program factor associated with the second application, retrieving a second password associated with the password request for the second application based on the confirmation of the first program factor associated with the second application, and providing the second password to a third digital device.

In some embodiments, a system comprises a security registration module, an account management module, and a password manager module. The security registration module may be configured to receive a registration request at a first digital device for a first application and receive a first program factor associated with the first application. The account management module may be configured to confirm the first program factor. The password manager module maybe configured to generate a first password for a second application based, at least, on the confirmation of the first program factor and to provide the first password to the second application.

Further, a system may comprise a means for receiving a registration request at a first digital device for a first application, a means for receiving a first program factor associated with the first application, a means for confirming the first program factor, a means for generating a first password for a second application based, at least, on the confirmation of the first program factor, and a means for providing the first password to a second digital device.

DETAILED DESCRIPTION OF THE INVENTION

In various embodiments, an application on a computer that seeks access to a secured application and/or secured database must use a password. A security appliance on a network may be configured to provide the password to the computer when appropriate conditions are met. Appropriate conditions include, but are not limited to, a degree of confidence that the password, if sent to the computer, will not be compromised or that the secured application and/or secured database will not be accessed by an unauthorized user or program. In some embodiments, the security appliance can be utilized to retrieve current credentials, such as passwords, instead of hard-coding the credentials inside of a program.

An application that seeks access to a secured application or secured database may be required to be registered before access is first granted. During registration, the seeking application may be identified as well as the user of the application and the user's purpose in access. In one example, the computer with the seeking application may send a registration request with all necessary information to the security appliance. The security appliance may send the registration request to various approvers and provide further analysis of the request. If the request is approved, a password may be provided to the computer with the seeking application.

In some embodiments, registration is approved based on program factors. Program factors may characterize the application, user, or the user's computer. In a few examples, one or more program factors may be used to authenticate and confirm the seeking application, the computer, and/or the user. The program factors may also be used to provide additional security.

In one example, the registration request may comprise program factors that are to be reviewed by the security appliance and/or by one or more approvers. If the program factors are confirmed or otherwise approved, then the registration request may be approved or further review of the registration request (e.g., the user's purpose or whether the user is authorized for access) may be performed. If the program factors are not approved, the security appliance and/or the one or more approvers may deny access to the secured application and/or the secured database.

In some embodiments, the terms A2A (Application to Application) and A2DB (Application to DataBase) refer to two common client/server application deployment models. For an exemplary A2A model, a client application (the first A) communicates with an application server (the second A). For an exemplary A2DB model, a client application communicates with a database server (the DB).

Figure 1:
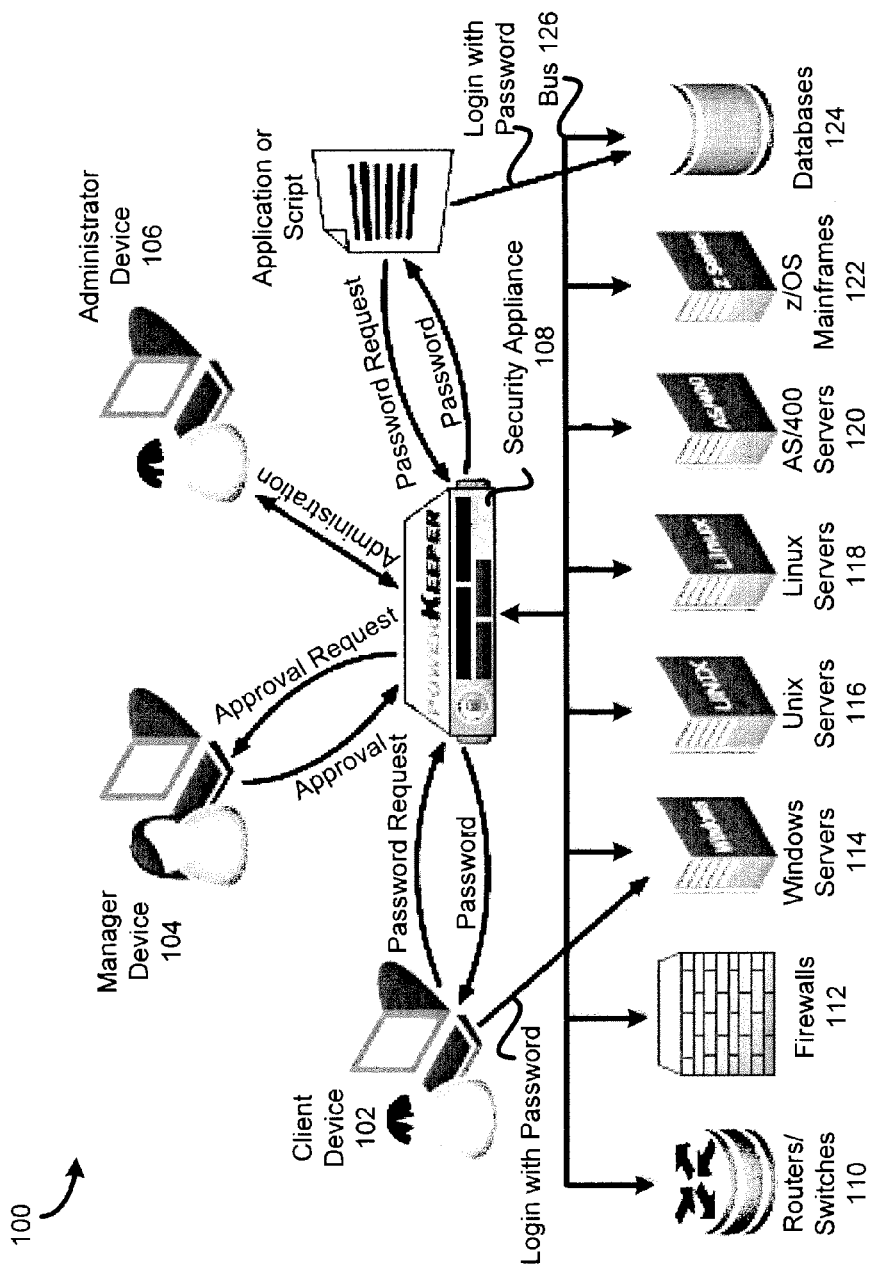
FIG. 1 illustrates an exemplary environment.

FIG. 1 illustrates an exemplary environment 100. The exemplary environment 100 comprises a client device 102, a manager device 104, and an administrator device 106 which may each communicate with the security appliance 108. Routers/switches 110, firewalls 112, windows servers 114, Unix servers 116, Linux servers 118, AS/400 servers 120, z/OS mainframes 122, and databases 124 may each be operatively coupled to a bus 126 which may be operatively coupled to the security appliance 108.

In various embodiments, a digital device may comprise the client device 102, the manager device 104, the administrator device 106, the security appliance 108, routers/switches 110, firewalls 112, the windows servers 114, the Unix servers 116, the Linux servers 118, the AS/400 servers 120, the z/OS mainframes 122, and/or the databases 124. A digital device is any device with a processor and memory such as a computer. Digital devices are further described herein.

The client device 102 is any digital device with an application that may seek access to a secured application and/or secured database. In one example, the user of the client device 102 may be an accountant and the seeking application may be Microsoft Access. The accountant may wish to access a secured accounting database on a network (e.g., stored within the databases 124). Before the seeking application gains access to the secured accounting database, a request to access the database (e.g., a registration request) may be approved. Once approved, the client device 102 may receive a password to be stored within the client device 102. Alternately, the password is not stored within the client device 102 but rather the client device 102 may receive the password when the seeking application requests access to the secured application. In some embodiments, the password may be associated with an expiration event after which the password is expired and the client device 102 must then request another password. The process of registering and seeking passwords is further described herein.

A seeking application is any application that is required a password or other authentication information before accessing a secure application and/or secured database. A secured application is any application that requires a password or other authentication information before being able to access the secured application. Similarly, a secured database is any database that requires a password or other authentication information before access is granted.

The manager device 104 is any digital device that may approve a registration request. In some embodiments, a registration request may be provided by the client device 102. The registration request may include information about the user of the client device 102, the client device 102, itself, and/or the seeking application. The manager and/or an application on the manager device 104 may review the registration request and approve or deny the request. In one example, the manager device 104 is operated by a manager that may approve the registration request from the client device 102. In another example, the manager device 104 may be configured to automatically approve the registration request. In some embodiments, the manager of the manager device 104 may approve one or more components of the registration request (e.g., program factors discussed herein) and the manager device 104 is configured to approve the same or different components of the registration request.

In another example, the manager may receive the registration request that indicates the user and the seeking application. If the user is authorized for access (e.g., the user is an accountant seeking access for financial information) and the seeking program is confirmed based on program factors, the manager may approve the registration request, thereby allowing the seeking application access. Those skilled in the art will appreciate that there may be any number of ways a manager and a managing device 104 may, either in combination or separately, review and examine registration requests for approval or denial. Further, those skilled in the art will appreciate that the manager device 104 may be optional and the approval process may take place within the security appliance 108 (further described herein) and/or the administrator device 106.

The administrator device 106 is any digital device that configures the security appliance 108. In various embodiments, the administrator device 106 is operated by an administrator (e.g., a network administrator, security officer, or IT professional) who can configure the security device 108. In one example, the administrator device 106 may display a configuration interface (e.g., a web page from the security appliance 108) that allows configuration. The administrator device 106 may configure the security appliance 108 to perform different tasks depending upon the seeking application, the user of the user device 102, and/or the user device 102. In one example, the administrator device 106 may specify specific manager devices 104 which must approve a registration request from a specific user name before the registration request may be approved and access to a secured application provided (e.g., via a password). The administrator device 106 may also specify program factors that must be confirmed as well as what the values of the program factors are expected to be. Those skilled in the art will appreciate that the security appliance 108 may be configured in any number of ways.

The security appliance 108 may comprise hardware, software, or a combination of both. In various embodiments, a digital device comprises the security appliance 108. The digital device may be cabled to (or otherwise in communication with) the bus 126. In some embodiments, the security appliance 108 may comprise software configured to be run (i.e., executed) by a server, router, or other device. The security appliance 108 may also comprise hardware. For example, the security appliance 108 may comprise a windows 2003 server (such as a hardened Windows 2003 server), with quad-core CPUs, hot swap mirrored drives, redundant power supplies, and redundant fans. The security appliance 108 may also comprise redundant CPUs and hot-bank memory.

In various embodiments, the security appliance 108 is configured (e.g., by an administrator and/or the administrator device 106) to provide security for applications and databases. In some examples, the security appliance 108 may be configured to process registration requests, generate and change passwords, and log relevant information.

In some embodiments, the security appliance 108 processes registration requests. In one example, prior to a seeking application on a client device 102 being allowed to access a secured application or secure database, the security appliance 108 may require registration. The user device 102 may then provide a registration request to the security appliance 108. The registration request may include information regarding the user, the client device 102, and/or the seeking application. Based on a prior configuration, the security appliance 108 may, based on the user, the client device 102, and/or the seeking application, review the registration request and/or route the registration request to one or more manager devices 104 for approval. In one example, the security device 108 may be configured to determine if the client device 102 and/or the user logged into the client device 102 have rights to the secured application and/or secured database. If the client device 102 and/or the user do not have rights, the security appliance 108 may be configured to deny the registration request. The security device 108 may also be configured to email or otherwise contact one or more manager devices 104 to receive approval for the registration request. For example, the administrator may configure the security device 108 to email all registration requests associated with a particular seeking application to a predetermined number of managers and/or manager devices 104. In some embodiments, the security device 108 may not approve the registration request until all managers and/or manager devices approve the registration.

The security device 108 may also be configured to generate and/or change passwords. In various embodiments the security device 108 is configured to generate the password to the secure application and/or secured application. In one example, the method to create a password in a specific secured database (e.g., a secured SQL database) is stored within the security device 108. The security device 108 may then execute the method. For example, the method may comprise executable instructions which are executable by a processor to perform a method of creating or changing a password for one or more secured applications and/or secured databases. The security device 108 may interact directly with one or more digital devices, secured applications, and/or secured databases to create or change the password. Once the password is generated, the security device 108 may store the password.

The security device 108 may also change the password to the secured application and/or the secured database. In various embodiments, the security device 108 determines an expiration event after which a password is expired (e.g., after a predetermined time or date). At that time, the security device 108 will change the password to the secured application and/or the secured database. In one example, the security device 108 interacts with the secured application and/or the secured database to change the password and then the security device 108 may store the password.

It will be appreciated by those skilled in the art that the security appliance 108 may encrypt the password and/or encrypt storage where the password is stored. Further, the security appliance 108 may encrypt all communications between the security appliance 108 and any other digital device (e.g., all communication between the client device 102 and the security appliance 108 may be encrypted). In various embodiments, the security appliance 108 performs FIPS-140 validated encryption of data and communications, access control mechanisms, secure storage of credentials, secure audit trails. The security appliance 108 may also comprise a sealed operating system.

The security appliance 108 may also be configured to log all registration requests, passwords, password changes, and password requests thereby creating a record of the activities of each user, client device 102, and/or seeking application. In some embodiments, the logs of the security appliance 108 may be used to confirm that the secured application and/or the secured database are being used as approved. The logs may also be encrypted. In various embodiments, the logs may be audited (e.g., by the administrator and/or the administrator device 106). The security appliance 108 may also be configured to provide reports regarding user/approver, requester activities, password maintenance, user and file entitlement (rights) and/or internal diagnostics. In a few examples, the reports may be exportable in CSV and HTML formats.

Although FIG. 1 shows curved lines between the client device 102 and the security appliance 108, the manager device 104 and the security appliance 108, as well as the administrator device 106 and the security appliance 108, those skilled in the art will appreciate that the client device 102, manager device 104, and administrator device 106 may not be each directly connected to the security appliance 108. In one example, the client device 102, manager device 104, and administrator device 106 may be in communication with the security device 108 over one or more networks. The curved lines in FIG. 1 may depict the nature of the communication between a digital device and the security appliance 108. In one example, in order to receive a password to log into the windows servers 114, the client device 102 may send a password request to the security appliance 108. The security appliance 108 may be configured by the administrator device 106 (e.g., as depicted in FIG. 1 as "administration") to send the password request to the manager device 104 for approval. The manager device 104 may send the approval to the security appliance 108 which may then provide the password to the client device 102. The password may then be provided to the Windows servers 114. In some embodiments, the password is not visible or displayed to the user of the client device 102.

In another example, the client device 102 may comprise a seeking application or script (depicted in FIG. 1) which seeks access to a secured database. Prior to access, the client device 102 (e.g., via the seeking application or script) may provide the password request to the security appliance 108 which may either provide the password or provide the password after the proper approvals have been obtained. The password may then be sent to the client device 102 which may log into the secured database to obtain access with the password.

Those skilled in the art will appreciate that the security appliance may not be limited to password management. Although various embodiments described herein refer to generating, changing, and providing passwords to access the secured application and/or the secured database, those skilled in the art will appreciate that similar systems and methods may be used with any form of security, including the issuance of encryption keys (e.g., private or public keys), certificates, digital signatures, decryption keys, credentials as well as rights management to files, volumes, and/or devices. In various embodiments, instead of a password being provided to the client device 102, the security appliance 108 may alter user rights such that the user may view, access, make changes to, and/or share the secured application and or secured database. In some embodiments, the security appliance 108 may provide a password to the client device 102 as well as make changes to file rights. In exemplary embodiments, the security appliance 108 may provide access in many ways.

In some embodiments, the client device 102 may be required to provide a registration request for rights to a program or database on another digital device. The rights may include, but are not limited to, rights to view, access, make changes, and share with other users. The security appliance 108 may perform similar tasks as when a password is requested. In one example, the security appliance 108 may examine the registration request and analyze program factors to ensure that the seeking application, user, or client device 102 is authorized and/or authenticated. The registration request may also be approved by one or more manager devices 104. Upon approval, the security appliance 108 may grant any number of rights to access the application or database. Further, the security appliance 108 may generate a new password for the sought application or database and/or provide the password to the client device 102.

Although the security appliance 108 is depicted as communicating directly over the bus 126, the security appliance 108 may also communicate indirectly over the bus 126. In one example, the security appliance 108 may be a part of or otherwise coupled to the client device 102, the manager device 104, the administrator device 106, the security appliance 108, the routers/switches 110, the firewalls 112, the windows servers 114, the Unix servers 116, the Linux servers 118, the AS/400 servers 120, the z/OS mainframes 122, and the databases 124. Alternately, those skilled in the art will appreciate that there may be multiple networks and the security appliance 108 may communicate over all, some, or one of the multiple networks.

The security appliance 108 may comprise a software library that provides a programmatic interface to the security appliance 108. In one example, an API library resident on the security appliance 108 may have a small set of functions that are rapidly mastered and readily deployed in new or existing applications. There may be several API libraries, for example one library for each computer language or technology, such as, Java, .NET or C/C++ languages. Each specific instance, the API library may provide the same set of functions.

The routers/switches may comprise any number of routers and/or switches. In some embodiments, the security appliance 108 may manage rights or access to one or more routers or switches. The client device 102 may be required to provide a registration request and receive approval before rights to access the routers or switches are approved. The routers/switches 110 may comprise Cisco routers and switches for example. In another example, the routers/switches 110 may comprise a Terminal Access Controller Access-Control System (TACACS). The routers/switches 110 may also comprise web proxies or caches including, but not limited to, BlueCoat Security Gateway devices.

The firewalls 112 may comprise hardware, software, or a combination of both hardware and software. Control to access and manage the firewalls 112 may be controlled by the security appliance in a method similar to that described herein. In one example, before the user of the client device 102 is permitted to access and/or configure the firewall 112, the client device 102 may be required to provide a registration request that must be approved. In a few examples, the firewalls 112 may comprise Cisco PIX, Netscreen, Nokia IPSO, Check Point, or Cyberguard.

The windows servers 114 may include any server configured with a Microsoft Windows operating system. In a few examples, the Microsoft operating system may be Windows 2000, 2003, XP, Media Center, Active Directory, NT 4.0, NT Domains, Vista, and Windows 7.

The Unix servers 116 may include any server configured with a Unix operating system. In a few examples, the Unix operating system may be Solaris, AIX, HP-UX, Tru64, or UnixWare. Similarly, the Linux server 118 may be any server configured with the Linux operating system. In a few examples, the Linux operating system may be Red Hat or Suse.

The AS/400 servers 120 and the z/OS servers 122 may include any server(s) with the associated operating system. Further a server may be configured with RACF, HP iLo, VMware, BoKS, Fujitus RSB, and Radius.

The databases 124 may comprise hardware, software, or a combination of hardware and software. In one example, the databases 124 are on a file server. The databases may include Oracle databases, Microsoft SQL, Sybase, MySQL, DB2 or any other database for example.

Those skilled in the art will appreciate that many operating systems, databases, and applications may be in communication with or otherwise coupled to the bus 126. The examples listed herein are not intended to be limiting and other operating systems, databases, and applications may be used in conjunction with various embodiments described herein.

The bus 126 may provide communication between the client device 102, the manager device 104, the administrator device 106, the security appliance 108, routers/switches 110, firewalls 112, the windows servers 114, the Unix servers 116, the Linux servers 118, the AS/400 servers 120, the z/OS mainframes 122, and/or databases 124. In some embodiments the bus 126 represents one or more network(s) which one or more digital devices may use to communicate. In some examples, the bus 126 comprises Ethernet cables, fiber optic, or other wired network topology. In other examples, the bus 126 may be wireless and support wireless communication between two or more wireless devices. Those skilled in the art will appreciate that the bus 126 may comprise two or more networks, including wired and wireless networks.

Although the routers/switches 110, the firewalls 112, the windows servers 114, the Unix servers 116, the Linux servers 118, the AS/400 servers 120, the z/OS mainframes 122, and the databases 124 are discussed as plural, those skilled in the art will appreciate that there may be any number of (including one or zero) routers/switches 110, the firewalls 112, the windows servers 114, the Unix servers 116, the Linux servers 118, the AS/400 servers 120, the z/OS mainframes 122, and the databases 124 and be within embodiments described herein.

Figure 2:
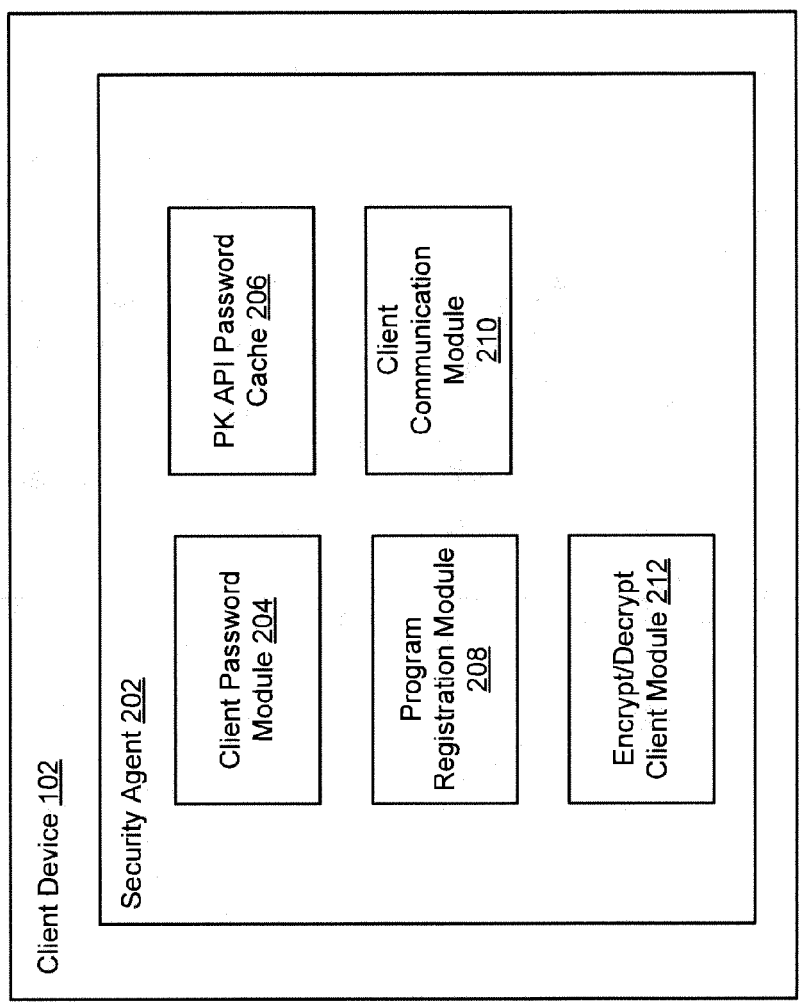
FIG. 2 is a block diagram of a client device comprising a security agent in one embodiment.

FIG. 2 is a block diagram of a client device 102 comprising a security agent 202 in one embodiment. The security agent 202 may be software, hardware, or a combination of software and hardware. In one example, the security agent 202 is a client on the client device 102 configured to provide a registration request to the security appliance 108, receive passwords, store passwords, and/or provide passwords for or to seeking applications on the client device 102 to access a secured application and/or secured database.

The security agent 202 may comprise a client password module 204, a PK API password cache 206, a program registration module 208, a client communication module 210, and an encrypt/decrypt client module 212. In various embodiments, the client password module 204 is configured to control the security agent 202. The client password module 204 may be configured to retrieve passwords from the security appliance 108, store passwords, collect program factors, and provide a registration request.

In one example, the client password module 204 may be configured to retrieve a password from the PK API password cache 206. In one example, the client device 102 activates an application that seeks access to a secured application. The client password module 204 may then determine if the seeking application has already been registered. If the seeking application is registered, the client password module 204 may request a password associated with the seeking application from the PK API password cache 206.

The PK API password cache 206 is any memory or storage configured to store a password. In various embodiments, the PK API password cache 206 is configured to store passwords once a seeking application is registered (e.g., the registration request is approved). The PK API password cache 206 may be encrypted as described herein. In some embodiments, the PK API password cache 206 may comprise memory (e.g., RAM) or storage (e.g., hard drive) that is otherwise used by the client device 102.

In some embodiments, the PK API password cache 206 stores a password and an expiration event which is associated with the password. Upon an application seeking access to a secured application, the client password module 204 may determine if the seeking application is already registered, and, if so, retrieve the password and associated expiration event from the PK API password cache 206. The client password module 204 may then determine if the password is expired based on the expiration event. If the password is not expired, the client password module 204 may pass the password to the seeking application and/or to the secured application via the client communication module 210. If the password is expired, the client password module 204 may provide a password request to the security appliance 108 to receive a new password and a new expiration event associated with the new password. The PK API password cache 206 may then store the new password and the new expiration event.

The PK API password cache 206 may contain one or more recently retrieved passwords. In some embodiments, the PK API password cache 206 retains the recently retrieved password(s) to minimize communication with the security appliance 108. The administrator device 106 may be configured to control whether the PK API password cache 206 retains any passwords. In various embodiments, the administrator device 106 may allow some client device 102 to retain passwords and disallow other digital devices to retain passwords.

If the client password module 204 determines that the seeking application was not previously registered, the program registration module 208 may generate a registration request. The registration request may comprise information regarding the seeking application, the user, and/or the client device 102. In one example, the registration request may identify the application, the username currently logged onto the client device 102, and identify the client device 102 (e.g., by IP address or machine name). In one example, the client password module 204 generates the registration request by calculating a unique signature of the seeking program using the executable contents of the seeking application along with one or more program factors determined by the administrator and/or the administrator device 106. The program signature may be analogous to a human fingerprint in that no two seeking application may have the same signature. In some embodiments, the program factors are included a part of the registration request. In other embodiments, the program factors are separate but may be provided with the registration request.

The client password module 204 may also collect information regarding one or more program factors. Program factors may comprise application authentication factors and system authentication factors. A few examples of program authentication factors include a program name, program version, program executable hash, dependent DLL or shared library names, and dependent DLL or shared library versions. In one example, the program factors include the name of the seeking application as well as the version number of the seeking application. In some embodiments, the program registration module 208 makes a hash of the executable of the seeking application and includes the hash as a program factor. Further, the program registration module 208 may include the name or copy one or more DLL libraries that are dependent upon the seeking application (and/or shared library names) within the program factors. Further, the program registration module 208 may include the version number of one or more DLL libraries and/or shared libraries in the program factors. In some embodiments, the program authentication factors may be used to confirm that the seeking application is authentic as opposed to malware posing as an otherwise authorized seeking application.

A few examples of system authentication factors include a system name, a fully qualified domain name (FQDN), a domain name, an IP address, a MAC address, a user name, a user ID, a CPU ID, a CPU serial number, a root disk volume, an OS version, or an OS type. In one example, program factors include a name of the client device 102 as well as an FQDN of the client device 102. In some embodiments, the program factors may include the domain name associated with the client device 102, as well as an IP address and/or a MAC address of the client device 102. Further, the program factors may include a user name of a user of the client device 102 (e.g., the user name used to log into the client device 102 or the user name associated with the seeking application) and/or a CPU ID. In some embodiments a user ID may be used. For example, the user ID may be used to log into the client device 102, may be associated with the seeking program, or may be required by the security agent 202 before registration. Moreover, the program factors may include a serial number of the CPU, the name of the root disk volume, the version of the OS running on the client device 102, and/or the type of the OS running on the client device 102. In some embodiments, the system authentication factors may be used to confirm and/or authenticate the client device 102. In one example, the system authentication factors may confirm that the registration request is provided from the client device 102 and not from another digital device posing as the client device 102 that is not authorized.

Those skilled in the art will appreciate that the program factors are not limited to only those identified herein, but may include other information regarding the seeking application, the user, or the client device 102. In some embodiments, the program factors may include a path of the executable of the seeking application. In one example, the path of the executable program of the seeking application may be determined and then copied as a program factor. Further, in some embodiments, information regarding debugging may also be included as a program factor. For example, running threads or signals may be scanned. If a debugging program is detected (e.g., via trap signals or threads related to debugging), the information is provided (e.g., debugging information) as a program factor. If the security appliance 108 determines a debugging program is active, the security appliance 108 may deny registration or deny sending the client device 102 a password.

In some embodiments, the program registration module 208 may receive a request for one or more challenge program factors (i.e., a challenge factor request) from the security appliance 108. The challenge program factor request is a request for additional information such as another program authentication factor and/or another system authentication factor. The challenge program factor(s) may be used to further confirm the seeking application and/or the client device 102. Once the information is collected, the client device 102 may provide a challenge factor response containing the requested program factors. The challenge program factor(s) may be used to change the traffic received by the client device 102 as well as the response from the client device 102 in order to obscure signals related to information delivery between the client device 102 and the security appliance 108 in case data is being sniffed by an unauthorized machine.

The client communication module 210 is configured to provide communication between the client device 102 and the security appliance 108. In various embodiments, the client communication module 210 may intercept password requests from a seeking program and notify the client password module 204 to retrieve the password from the PK API password cache 206, provide a password request to the security appliance 108, or generate a registration request. The client communication module 210 may also be configured to communicate between the security agent 202 and the security appliance 108.

The encrypt/decrypt client module 212 is configured to encrypt, decrypt, and/or otherwise secure information during communication between the client device 102 and the security appliance 108 and/or information stored by the security agent 202. The encrypt/decrypt client module 212 may encrypt, decrypt, or otherwise secure information in any number of ways including, but not limited to, those described herein.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 3:
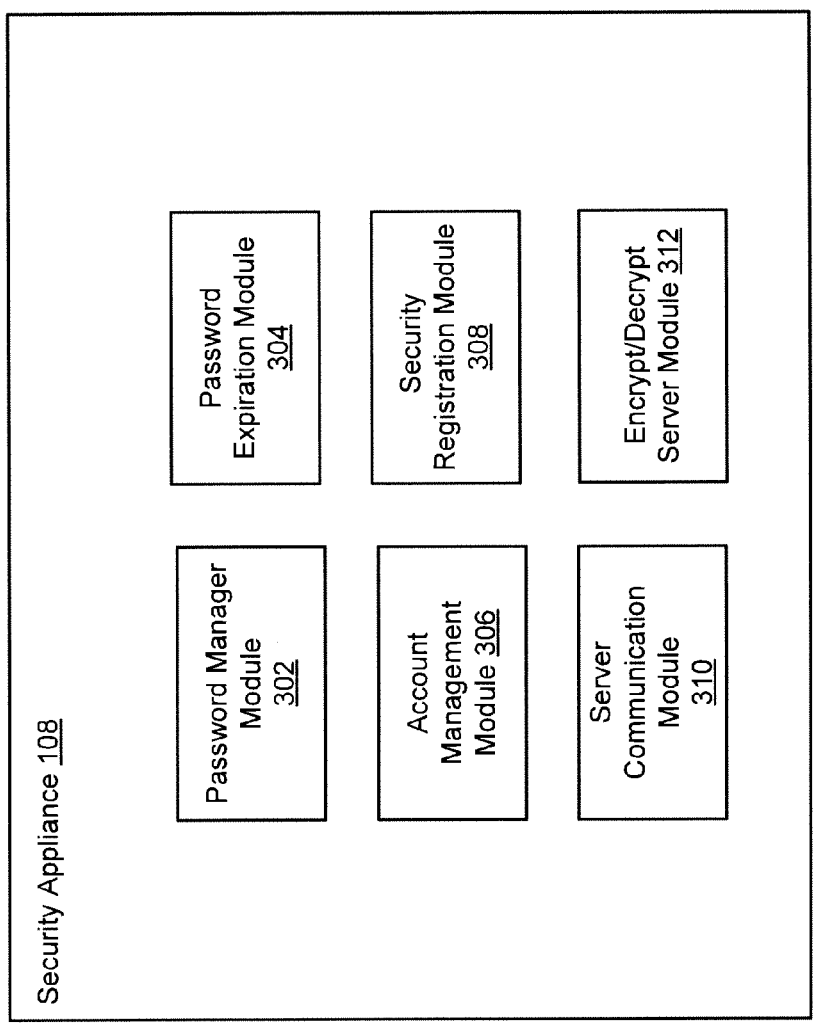
FIG. 3 is a block diagram comprising a security appliance in one embodiment.

FIG. 3 is a block diagram comprising a security appliance 108 in one embodiment. The security appliance 108 comprises a password manager module 302, a password expiration module 304, an account management module 306, a security registration module 308, a server communication module 310, and an encrypt/decrypt server module 312.

The password manager module 302 may be configured to control the security appliance 108. In some embodiments, the password manager module 302 may receive a password request from the client device 102. The account management module 306 may then determine if the password request is authentic and authorized (e.g., via one or more program factors that may be received with the password request). In one example, the account management module 306 identifies the user, the client device 102, and/or the seeking application based on the password request and/or any program factors accompanying the password request. The account management module 306 may maintain separate accounts for each user, client device 102, seeking application, and/or any combination of the three. A program account may be similar to a CLI user account but the program account may be maintained and stored in the security appliance 108.

The account management module 306 may be configured to confirm one or more program factors. The program factors may be a part of a registration request from the client device 102, password request, or challenge factor response. During registration (further described here), the account management module 306 may request that the security agent 202 collect any number of program factors. The account management module 306 may then store the program factors. In one example, during registration, the account management module 306 may request the path of the executable for the seeking program from the client device 102 as well as a program executable hash. This information may be stored and used to confirm program factors later received if the registration is successful. In one example, previously stored program factors may be used to confirm program factors associated with a password request from the client device 102.

In some embodiments, the administrator device 106 may configure the account management module 306 to store acceptable values of program factors. In one example, the administrator device 106 identifies acceptable IP addresses, OS types, CPU serial numbers, executable hash values, user IDs and the like. The account management module 306 may receive program factors to be used to allow, confirm, and/or authenticate program factors later received from the client device 102 in any number of ways including both from the client device 102 and the administrator device 106. In one example, program factors that are used to allow, confirm, and/or authenticate other program factors may be provided by the client device 102, the manager device 104, and/or the administrator device 106.

When the account management module 306 receives program factors from the client device 102, the account management module 306 may compare the program factors (after decryption) to previously stored values to determine if the program factors are approved and authentic. In other embodiments, one or more of the program factors may be authenticate and/or confirmed by a manager device 104.

The account management module 306 may be configured to change a password for a secured application or secured database. In some embodiments, the account management module 306 comprises a library of executable instructions which are executable by a processor for changing the password to a secured application or secured database. The library may comprise any number of methods for generating or changing passwords to any number of secured programs or secured databases. For example, a program stored in the library may be configured to change the password to a SQL database.

Once a password is generated or otherwise changed, the password expiration module 304 may determine an expiration event for the password. In some embodiments, the expiration event may be a few minutes before the password much be changed and a new expiration event determined. Alternately, the expiration event may be hours, days, weeks, or longer. Before expiration, passwords that are generated or changed can be used by the client device 102. In some embodiments, once the password is changed and the password expiration module 304 determines the expiration event, the password manager module 302 provides the password and the expiration event to the client device 102 which may store the password and the expiration event in the PK API password cache 206.

The security registration module 308 is configured to receive the registration request from the security agent 202 of the client device 102. In some embodiments, client password module 204 of the security agent 202 in the client device 102 will determine if a seeking program has first been registered before a password request is made. If the application is not registered, the program registration module 208 may generate the registration request as well as any program factors necessary for approval. The client password module 204 may then provide the registration request and the program factors to the password expiration module 304. In other embodiments, the security registration module 308 may first receive a password request from a seeking program on the client device 102 and then determine if the seeking application is registered. If the application is not registered, the security registration module 308 may send a request to the client device 102 for the registration request. In some embodiments, the request identifies one or more program factors that the client device 102 is to provide for approval of the registration request.

During registration, the security registration module 308 may examine one or more program factors received from the client device 102. In some embodiments, the security registration module 308 compares the program factors received from the client device 102 to predetermined values configured by the administrator device 106. Further, the administrator device 106 may configure the security registration module 308 to provide one or more of the program factors to one or more manager devices 104 for approval. In some embodiments, the same program factors may be approved by one or more manager devices 104 (or managers of the manager devices 104) as well as the security registration module 308. In one example, one or more program factors may be approved by the security registration module 308. One or more of the program factors and the registration request may then be forwarded (e.g., via email) to one or more manager devices 104 for approval. If the security registration module 308 determines that there is not a match, then the security registration module 308 may deny the registration request and the program factors and the registration request are not forwarded.

When the security registration module 308 forwards the registration request and the program factors to the one or more manager devices 104, the security registration module 308 may be configured to wait a predetermined period of time or when all approvals are received. In some cases, based on the configuration by the administrator device 106, any number of the program factors and/or the registration request may be approved by the manager devices 104 (or the approvers of the manager device 104). If the predetermined time expires and not all approvals are received, the security registration module 308 may deny the request. Further, if one denial is received at any time, the security registration module 308 may deny the request. If the request is denied, the seeking application may not be able to access the secured application and/or secured database.

The server communication module 310 is configured to provide communication between the security appliance 108 and the client device 102. The client communication module 210 may also be configured to communicate between the security agent 202 and the security appliance 108.

The encrypt/decrypt server module 312 may be configured to provide encryption, decryption, or other security measures for the security appliance 108. In some embodiments, the encrypt/decrypt server module 312 issues a program key. A program key can be an SSH DSS private key or an X509v3 client certificate, for example. The security appliance 108 may issue a program key for use on behalf a program account. In some embodiments, the program key may be a required parameter for API functions.

In some embodiments, the security appliance 108 does not allow direct access to the OS on the security appliance 108. Further, the security appliance 108 may comprise a firewall (e.g., with IPSEC support) to prevent hacking. Moreover, the security appliance 108 may perform encryption, such as FIPS-140 validated components, and perform hard disk AES 256-bit encryption for whole disk encryption. Passwords, once generated, may be stored with x509v3 certificates. In some embodiments, inbound connections may be only through HTTPS and SSH. The security appliance 108 may also support single- or two-factor authentication using LDAP Active Directory, SecureID, Safeword, and x509v3 certificates. The security appliance 108 may perform any or more than the functions listed herein.

As discussed herein, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 4:
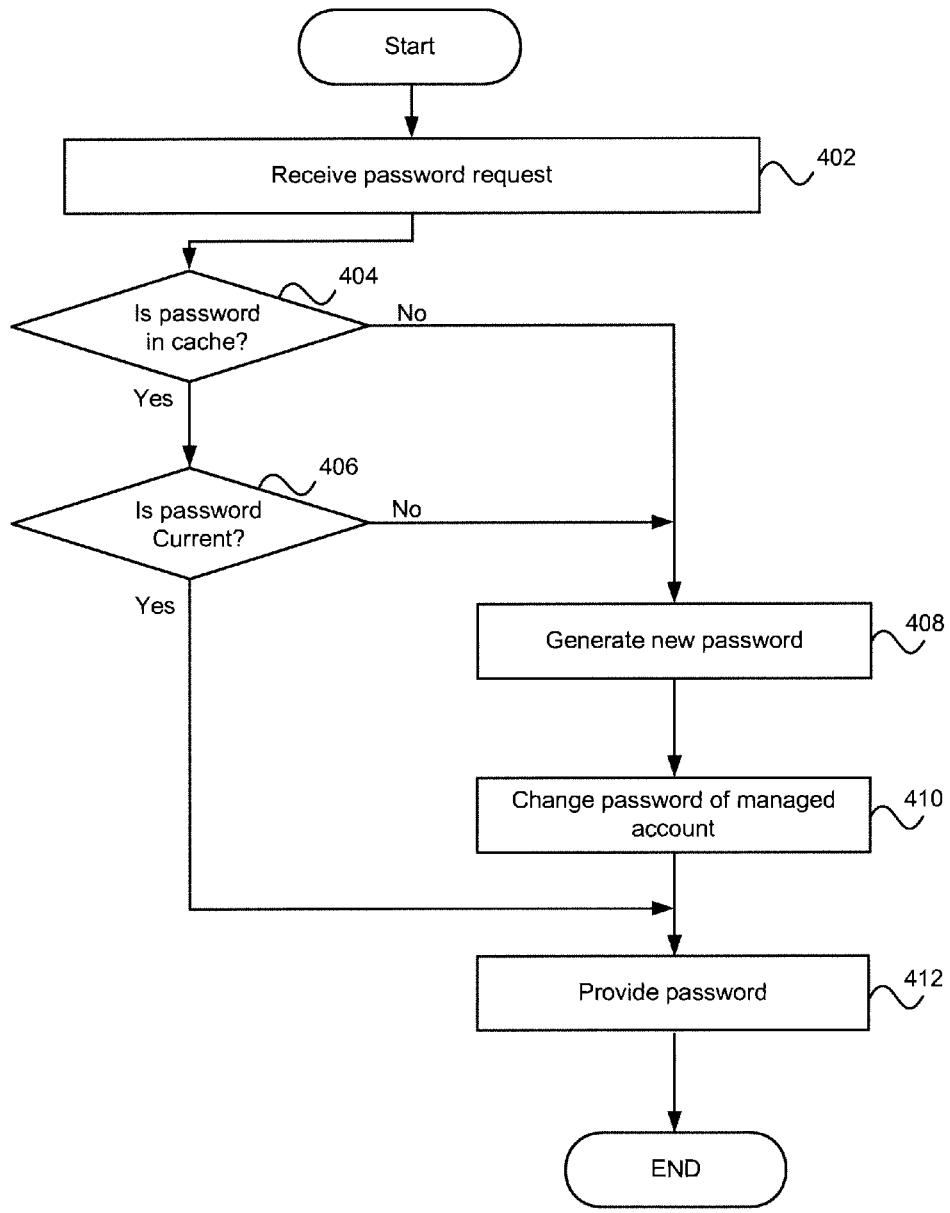
FIG. 4 is an exemplary method for providing a password in one embodiment.

FIG. 4 is an exemplary method for providing a password in one embodiment. In step 402, the client password module 204 receives a password request. In one example, a user of the client device 102 activates an application (i.e., a seeking application) that seeks to access a secure application. The client communication module 210 may recognize when the seeking application is activated, intercept a command to access the secured application, or intercept a password request, for example.

In some embodiments, the client password module 204 does not generate or provide the password request. Rather, when the security agent 202 determines a password or other credential is needed to access a secured application or secured database, the security agent 202 may generate a registration request. Based on the registration request, the security appliance 108 may determine if the seeking application is already registered. If the seeking application is already registered, the security appliance 108 may then provide a password from cache, direct the security agent 202 to retrieve the password from cache on the client device 102, or generate a new password for the security agent 202.

In step 404, the client password module 204 determines if the password for the seeking program to access the secured program is in the PK API password cache 206. If the seeking application has already been registered, the password may be within the PK API password cache 206. If the password in the cache, then the client password module 204 may retrieve the associated expiration event to determine if the password is current (i.e., not expired) in step 406. If the password is not in the cache or the password is in the cache but is expired, then a password request (e.g., a password check out request) may be sent to the security appliance 108.

The password request may be received by the security appliance 108. In some embodiments, the client password module 204 provides the password request to the security appliance 108 based on activation of the seeking application, interception of a command to access the secured application, or interception of the password request. The account management module 306 may then determine if the password is in a cache of the security appliance 108 and determine if the password is current based on an expiration event. If the password is either not in the cache or if the password is not current, the account management module 306 may be configured to generate a new password.

In step 408, the account management module 306 generates a new password for the seeking application to access the secured application. In one example, the account management module 306 relies on executable instructions which are configured to change the password of the secured application. The generated password may comprise all characteristics required by the secured application based on the executable instructions. In one example, a secured application may request a password of that are 7 to 10 characters in length, and allows capital letters and numbers. Another secured application may request a password that is 5-8 characters in length, treats capitalized letters as lower case letters, but allows non-alphanumeric characters in the password.

Once a password is generated in step 408, the account management module 306 may change the password of the managed account in step 410. In one example, the account management module 306 may rely on executable instructions that are executable by a processor to perform a method to change the password of the secured application based on the generated password in step 508. Once the password of the managed account is changed, the password expiration module 304 may generate a new expiration event to indicate when the password may be required to be changed again.

Once the password is changed or the password is in the cache and the password is current, the password is provided in step 412. In some embodiments, the password is stored in cache (e.g., in cache of the security appliance 108 or the PK API password cache 206 of the client device 102). The account management module 306 may store the expiration event in the cache of the security appliance 108 or the PK API password cache 206 of the security agent 202. Further, the password may be provided to the seeking application and/or the secured application. In some embodiments, the user of the client device 102 does not have access to or can otherwise view the password.

In some embodiments, the password manager module 302 provides one or more program factors to the security appliance 108. In some examples, the password manager module 302 requires one or more program factors whenever a password is requested, a new password is generated, and/or when the password is changed. In one example, the client password module 204 retrieves a list of required program factors (the list may be determined by an administrator of and/or the administrator device 106) to provide to the security appliance 108. The account management module 306 may then determine if the program factors are authentic or otherwise correct before generating a new password or changing the password. If the program factors are incorrect, the request for the password may be denied and the incident logged.

It will be appreciated by those skilled in the art that the security appliance 108 may be used by multiple client devices 102. In one example, a first client device 102 may provide a registration request to the security appliance 108 while a second client device 102 provides a password request to the same security appliance 108. A single security appliance 108 may support any number of client devices 102. In some embodiments, the security appliance 108 may be a part of one of the client devices 102.

Figure 5:
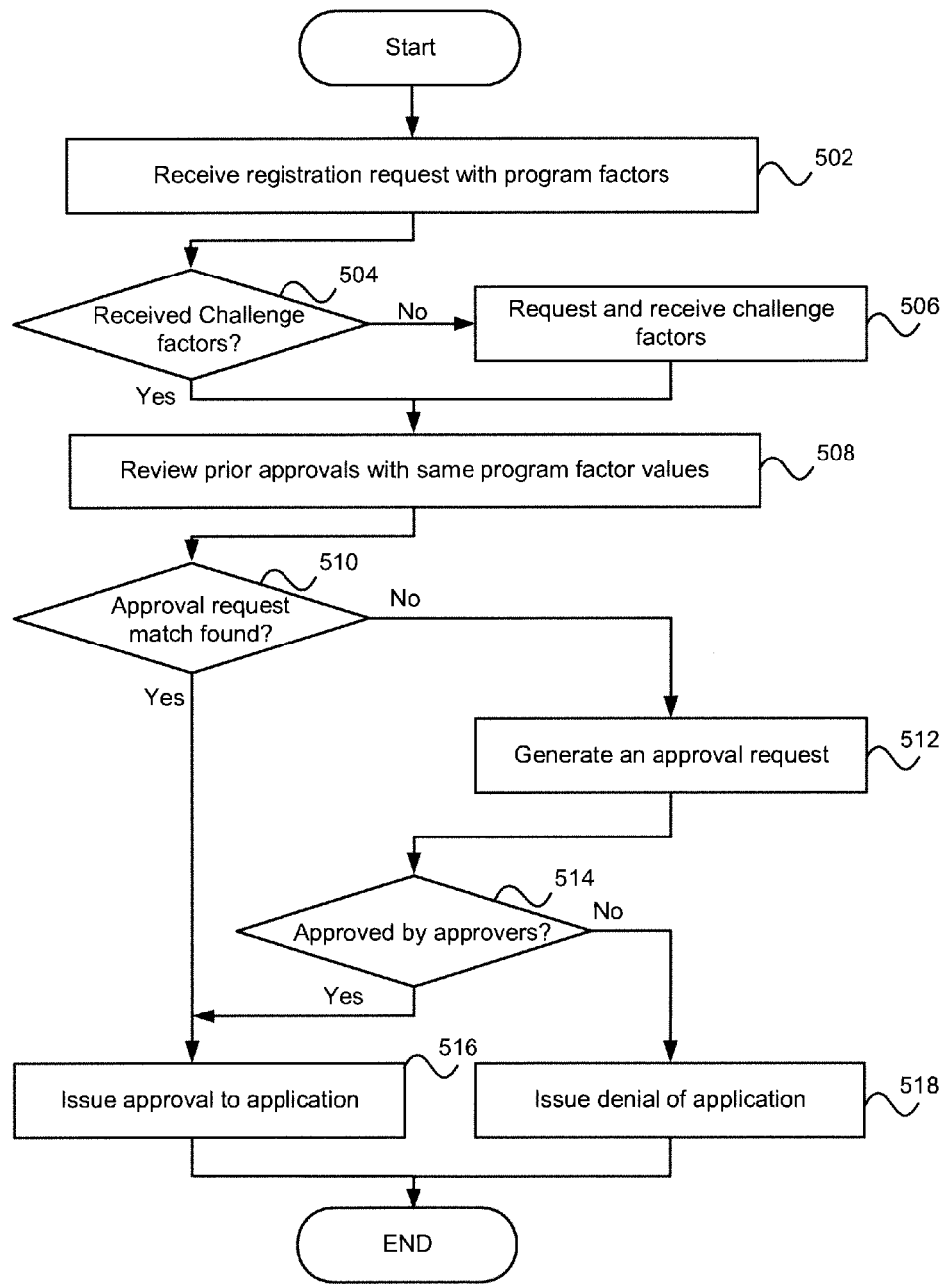
FIG. 5 is an exemplary method for registering requested access in one embodiment.

FIG. 5 is an exemplary method for registering requested access in one embodiment. In step 502, the security appliance 108 receives a registration request with program factors from the client device 102. In one example, the client communication module 210 of the security agent 202 provides the registration request to the security appliance 108. The password manager module 302 and/or the security registration module 308 may receive the registration request.

In step 504, the account management module 306 determines if challenge factors should be requested. In some embodiments, an administrator and/or an administrator device 106 configures the security appliance 108 to determine when and what challenge factors are requested. In one example, any number of challenge factors are requested whenever a registration request is received. In another example, challenge factors are requested at predetermined times, or when a predetermined number of registration request are received. Those skilled in the art will appreciate that challenge factors may be requested at any time.

In some embodiments, the challenge factors may include requests for any number of program authentication factors and/or system authentication factors. In one example, challenge factors may include instructions that instruct the security agent 202 to request information from the user (e.g., a user name, user ID, pass phrase, or the like). The challenge factors may also include a request for information regarding the seeking application (e.g., a hash of the executable of the application or the path of the executable of the application) and/or a request for information regarding the system (e.g., OS type, CPU serial number, or MAC address). Any challenge factors may be requested.

If challenge factors are to be examined, the security appliance 108 may determine which challenge factors to request and provide the request to the security agent 202. The client password module 204 may receive the request for the challenge factors and perform necessary functions to collect the requested information. Once the challenge factors are received, they are provided to the security registration module 308 in step 506. The security registration module 308 may then review the challenge factors and compare them against previously collected information (e.g., previously collected from the client device 102, the manager device 104, and/or the administrator device 106). If the challenge factors are not correct, the security appliance 108 may issue a denial of the registration request in step 518. In some embodiments, during registration, the security appliance 108 stores challenge requests to compare them to other program factors at another time.

In step 508, if no challenge factors are requested or if requested challenge factors are approved or otherwise stored for later examination, the security registration module 308 reviews prior approvals with same program factor values. If a match is found in step 510, the security registration module 308 may issue an approval of the registration request.

If a match is not found, the security registration module 308 may provide the registration request and/or any number of program factors to an approver or manager device 104 based on the configuration of the security appliance 108 by the administrator device 106. In various embodiments, a manager device 104 or administrator device 106 with the Grant Program Registration right for the seeking program may approve the registration request before the security appliance 108 may successfully generate and/or release a password. In some embodiments, the security appliance 108 may wait a predetermined period of time. If during that time, approval is received from all required sources as in step 514, the security registration module 308 may issue and approval for the registration request (see step 516). If, however, a denial is received or not all required approvals have been received by the timeout of the system, the security appliance 108 may issue a denial of the registration request in step 518.

In some embodiments, the security appliance 108 may provide the registration request and the program factors to the manger device 104. The manager device 104 may be configured to approve selected registration request and/or program factors automatically. Alternately, in some embodiments, the approver (e.g., user of the manager device 104) may review the registration request and one or more program factors and give their approval via the manager device 104.

Figure 6:
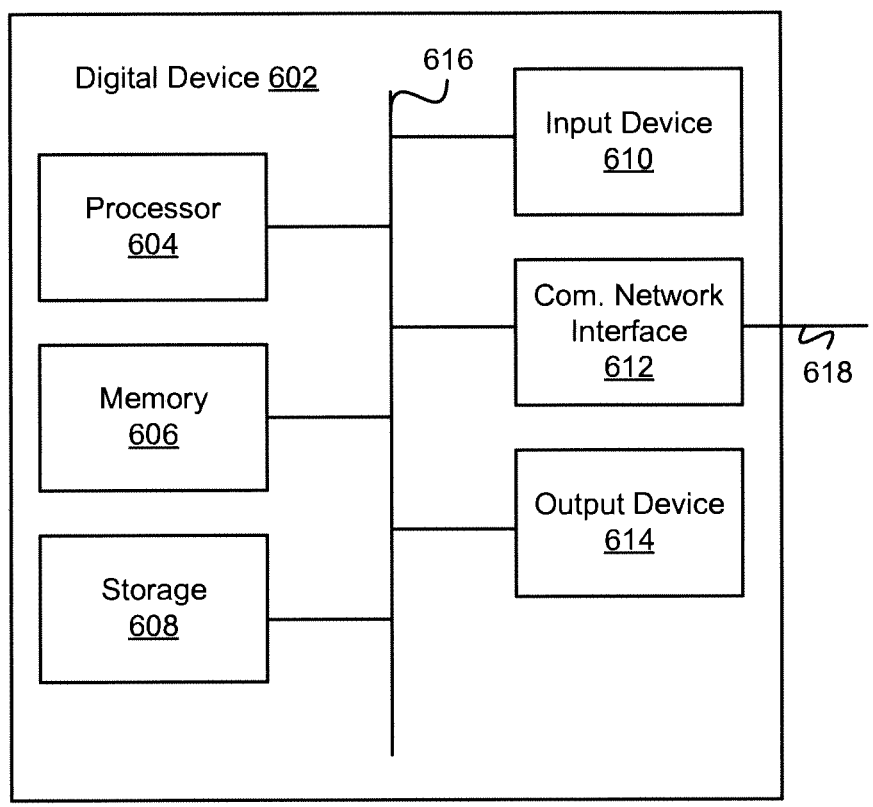
FIG. 6 is a block diagram of an exemplary digital device.

FIG. 6 is a block diagram of an exemplary digital device 602. Any of the client device 102, the manager device 104, the administrator device 106, the security appliance 108, routers/switches 110, firewalls 112, the windows servers 114, the Unix servers 116, the Linux servers 118, the AS/400 servers 120, the z/OS mainframes 122, and databases 124 may be an instance of the digital device 602. The digital device 602 comprises a processor 604, memory 606, storage 608, an input device 610, a communication network interface 612, and an output device 614 communicatively coupled to a communication channel 616. The processor 604 is configured to execute executable instructions (e.g., programs). In some embodiments, the processor 604 comprises circuitry or any processor capable of processing the executable instructions.

The memory 606 stores data. Some examples of memory 606 include storage devices, such as RAM, ROM, RAM cache, virtual memory, etc. In various embodiments, working data is stored within the memory 606. The data within the memory 606 may be cleared or ultimately transferred to the storage 608.

The storage 608 includes any storage configured to retrieve and store data. Some examples of the storage 608 include flash drives, hard drives, optical drives, and/or magnetic tape. Each of the memory system 606 and the storage system 608 comprises a computer-readable medium, which stores instructions or programs executable by processor 604.

The input device 610 is any device that inputs data (e.g., mouse and keyboard). The output device 614 outputs data (e.g., a speaker or display). Those skilled in the art will appreciate that the storage 608, input device 610, and output device 614 may be optional. For example, the routers/switchers 110 may comprise the processor 604 and memory 606 as well as a device to receive and output data (e.g., the communication network interface 612 and/or the output device 614).

The communication network interface (com. network interface) 612 may be coupled to a network (e.g., bus 126) via the link 618. The communication network interface 612 may support communication over an Ethernet connection, a serial connection, a parallel connection, and/or an ATA connection.

The communication network interface 612 may also support wireless communication (e.g., 802.11a/b/g/n, WiMax, LTE, WiFi). It will be apparent to those skilled in the art that the communication network interface 612 can support many wired and wireless standards.

It will be appreciated by those skilled in the art that the hardware elements of the digital device 602 are not limited to those depicted in FIG. 6. A digital device 602 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 604 and/or a co-processor located on a GPU (i.e., Nvidia).

The above-described functions and components can comprise instructions that are stored on a storage medium such as a computer readable medium. Some examples of instructions include software, program code, and firmware. The instructions can be retrieved and executed by a processor in many ways.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method, comprising:
  receiving during a registration process a registration request at a security appliance separate from a client device, the registration request being for a seeking application at the client device to access a secured application or secured database separate from the security appliance, the security appliance having at least one hardware processor;
  receiving, by the security appliance, a first program factor associated with the seeking application as part of the registration request, the security appliance being configured to accept the first program factor to assist in confirming authorization of the seeking application to access the secured application or secured database, the first program factor being a factor of the seeking application;
  receiving, by the security appliance, an access request after the registration process from the seeking application;
  obtaining, by the security appliance, a program factor instance for the seeking application;
  evaluating, by the security appliance, the program factor instance relative to the first program factor to assist in confirming authorization of the seeking application to access the secured application or secured database;
  generating, by the security appliance, a first security code for providing the seeking application with access to the secured application or secured database when the authorization of the seeking application to access the secured application or secured database is confirmed,
  generating, by the security appliance, an expiration event for causing the first security code to expire when the expiration event occurs;
  providing, by the security appliance, the first security code to the seeking application;
  receiving a security code request at the security appliance for the secured application or secured database;
  confirming a first program factor associated with the secured application or secured database;

retrieving a second security code associated with the security code request for the secured application or secured database based on the confirmation of the first program factor associated with the secured application or secured database; and providing the second security code to another client device.

2. The method of claim 1, further comprising determining if the first security code is within a cache.

3. The method of claim 2, further comprising providing to the security appliance the first security code from the cache based on the determination.

4. The method of claim 1, wherein the first program factor is selected from a group consisting of a program name, a program version, a program executable hash, a dependent DLL name, shared library names, a dependent DLL version, shared library versions, environmental factors, and debugging identification.

5. The method of claim 1, wherein the first program factor is selected from a group consisting of a system name, a fully qualified domain name (FQDN), a domain name, an IP address, a MAC address, a user name, a user ID, a CPU ID, a CPU serial number, a root disk volume ID, an OS version, and an OS type.

6. The method of claim 1, further comprising confirming a second program factor associated with the seeking application.

7. The method of claim 6, wherein generating the first security code is based, at least, on the confirmation of the first program factor and the confirmation of the second program factor.

8. The method of claim 1, further comprising determining if the first security code is expired.

9. The method of claim 1, wherein the first security code is one or more of: a password, a public encryption key, a private encryption key, a digital signature, a public decryption key, a private decryption key, credentials, and rights management to files, volumes, or devices.

10. The method of claim 1, wherein the first program factor comprises information about one or more of: a user, the seeking application, a computer device, and a purpose for accessing the secured application or secured database.

11. The method of claim 1, wherein the first security code comprises a temporary security code.

12. The method of claim 1, further comprising providing approval of the registration request based on confirmation of a challenge request response.

13. A system, comprising:
memory;
at least one hardware processor;
a security registration module executable by the at least one hardware processor to:
receive during a registration process a registration request at a security appliance separate from a client device, the registration request being for a seeking application at the client device to access a secured application or secured database separate from the security appliance; and
receive a first program factor associated with the seeking application, the security appliance being configured to accept the first program factor to assist in confirming authorization of the seeking application to access to the secured application or secured database, the first program factor being a factor of the seeking application;
an account management module executable by the at least one hardware processor to:
receive an access request after the registration process from the seeking application;
obtain a program factor instance for the seeking application;
evaluate the program factor instance relative to the first program factor to assist in confirming authorization of the seeking application to access the secured application or secured database;
receive a security code request at the security appliance for the secured application or secured database; and
confirm a first program factor associated with the secured application or secured database; and
a security code manager module executable by the at least one hardware processor to:
generate a first security code for providing the seeking application with access to the secured application or secured database when the authorization of the seeking application to access the secured application or secured database is confirmed,
generate an expiration event for causing the first security code to expire when the expiration event occurs,
provide the first security code to the seeking application;
retrieve a second security code associated with the security code request for the secured application or secured database based on the confirmation of the first program factor associated with the secured application or secured database; and
provide the second security code to another client device.

14. The system of claim 13, further comprising a client password module configured to determine if the first security code is within a cache.

15. The system of claim 14, wherein the client password module is further configured to provide to the security appliance the first security code from the cache based on the determination.

16. The system of claim 13, wherein the first program factor is selected from a group consisting of a program name, a program version, a program executable hash, a dependent DLL name, shared library names, a dependent DLL version, shared library versions, environmental factors, and debugging identification.

17. The system of claim 13, wherein the first program factor is selected from a group consisting of a system name, a fully qualified domain name (FQDN), a domain name, an IP address, a MAC address, a user name, a user ID, a CPU ID, a CPU serial number, a root disk volume ID, an OS version, and an OS type.

18. The system of claim 13, wherein the account management module is further configured to confirm a second program factor associated with the seeking application.

19. The system of claim 18, wherein the security code manager module is configured to generate the first security code based, at least, on the confirmation of the first program factor and the confirmation of the second program factor.

20. The system of claim 13, further comprising a security code expiration module configured to determine if the first security code is expired.

21. The system of claim 13, wherein the first security code is one or more of: a password, a public encryption key, a private encryption key, a digital signature, a public decryption key, a private decryption key, credentials, and rights management to files, volumes, or devices.

22. The system of claim 13, wherein the first program factor comprises information about one or more of: a user, the seeking application, a computer device, and a purpose for accessing the secured application or secured database.

23. The system of claim 13, wherein the first security code comprises a temporary security code.

24. The system of claim 13, wherein the security registration module is further configured to provide approval of the registration request based on confirmation of a challenge request response.

25. A system, comprising:

at least one hardware processor;

means for receiving during a registration process a registration request at a seeking application at the client device to access a secured application or secured database separate from the security appliance;

means for receiving a program factor associated with the seeking application as part of the registration request, the security appliance being configured to accept the program factor to assist in confirming authorization of the seeking application to access the secured application or secured database, the program factor being a factor of the seeking application;

means for receiving an access request after the registration process from the seeking application;

means for obtaining a program factor instance for the seeking application;

means for evaluating the program factor instance relative to the program factor to assist in confirming authorization of the seeking application to access the secured application or secured database;

means for generating a security code for providing the seeking application with access to the secured application or secured database if the authorization of the seeking application to access the secured application or secured database is confirmed;

means for generating an expiration event for causing the security code to expire when the expiration event occurs;

means for providing the security code to the seeking application;

means for receiving a security code request at the security appliance for the secured application or secured database;

means for confirming a first program factor associated with the secured application or secured database;

means for retrieving a second security code associated with the security code request for the secured application or secured database based on the confirmation of the first program factor associated with the secured application or secured database; and means for providing the second security code to another client device.

\* \* \* \* \*

UNITED STATES PATENT AND TRADEMARK OFFICE
CERTIFICATE OF CORRECTION

| | |
|---|---|
| PATENT NO. | : 9,160,545 B2 |
| APPLICATION NO. | : 12/497429 |
| DATED | : October 13, 2015 |
| INVENTOR(S) | : Iverson et al. |

It is certified that error appears in the above-identified patent and that said Letters Patent is hereby corrected as shown below:

In the Claims

Claim 25, column 21, line 11:
"request at a seeking application" should read -- request at a security appliance separate from a client device, the registration request being for a seeking application --

Signed and Sealed this
Twenty-second Day of March, 2016

Michelle K. Lee
*Director of the United States Patent and Trademark Office*